March 3, 1931.  F. T. O'GRADY  1,794,727
SHUTTER FOR MOTION PICTURE PROJECTING MACHINES
Filed Aug. 27, 1927  2 Sheets-Sheet 1
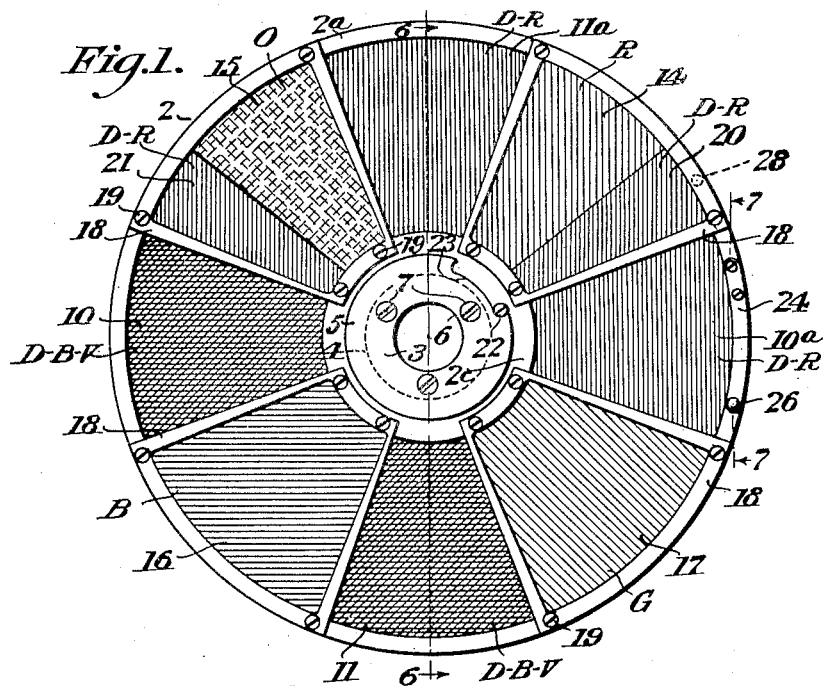
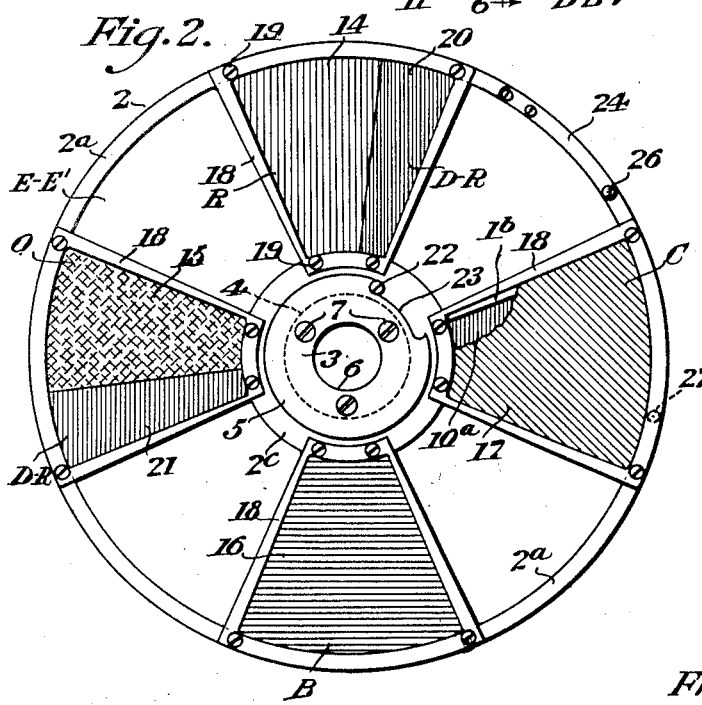
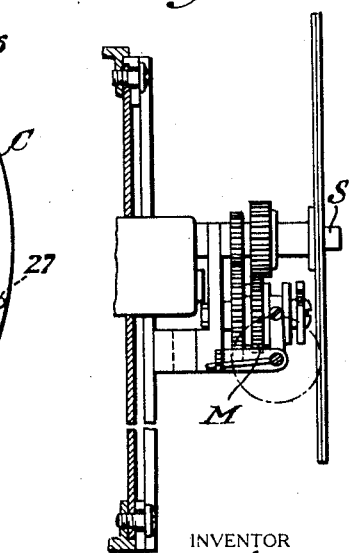
INVENTOR
*Frederick T. O'Grady*
BY
ATTORNEYS

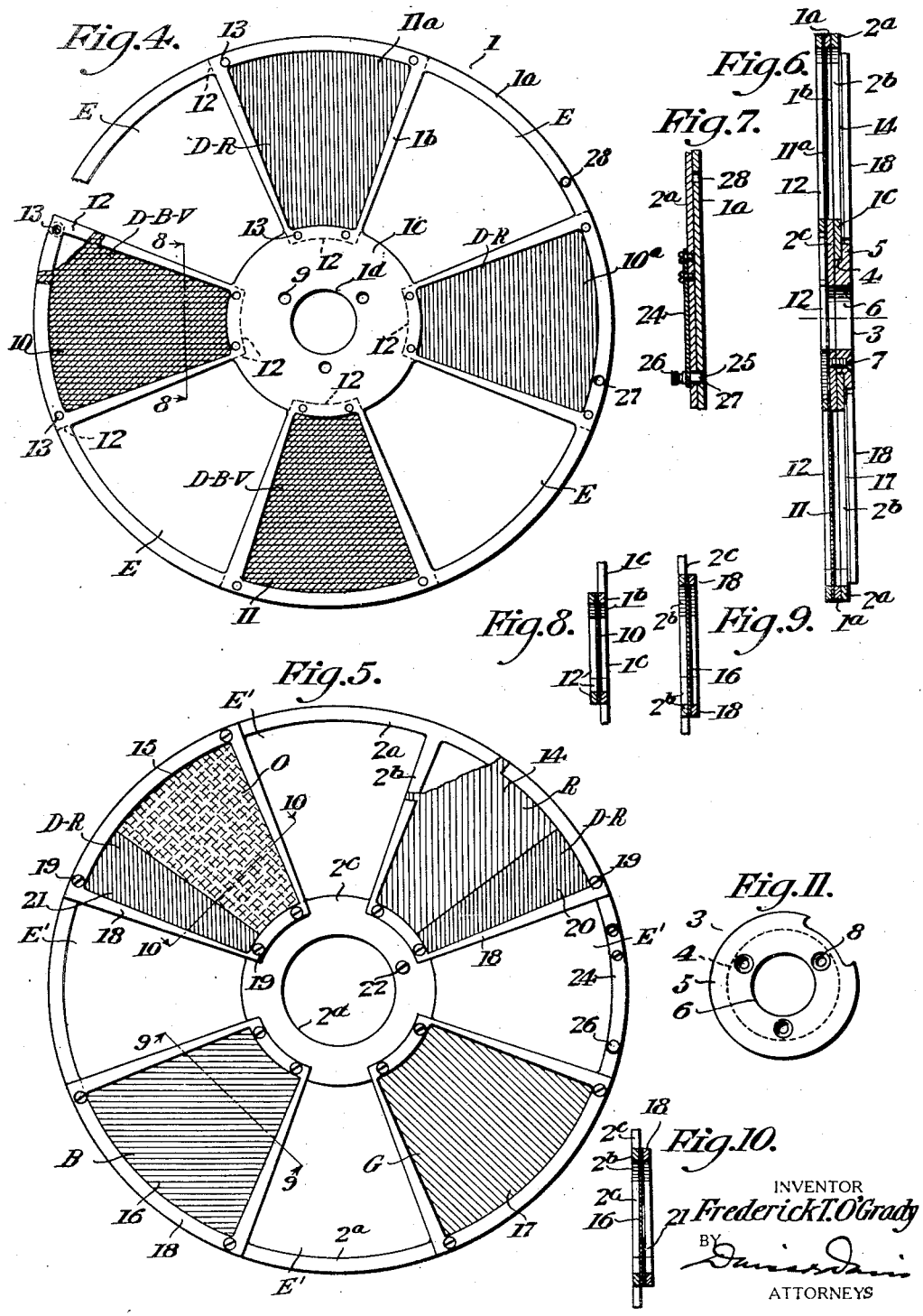

Patented Mar. 3, 1931

1,794,727

UNITED STATES PATENT OFFICE

FREDERICK T. O'GRADY, OF FLUSHING, NEW YORK

SHUTTER FOR MOTION-PICTURE-PROJECTING MACHINES

Application filed August 27, 1927. Serial No. 215,879.

The main object of this invention is to provide a simple and practical means, whereby a standard motion picture projection machine may be used for the projection of ordinary black and white motion picture films, or readily adapted for projecting color motion picture films by what is known as the "additive" method of color cinematography, the color being obtained by the use of a rotating color wheel or screen.

Another object of the invention is to provide a simple, unitary screen device which may be applied to motion picture projectors of standard form and is readily adjustable for either black and white or color projection.

Other objects will appear hereinafter.

In projecting black and white motion picture films, it is customary to employ a rotating shutter which is adapted, by suitable gearing, to interrupt the projection light flux during the change of picture areas as they are intermittently advanced through the projection machine. It is also customary to employ, in conjunction with the shutter blade, an anti-flicker blade, which is adapted to interrupt the projection light flux during the time the film images are held stationary in the projection machine. The purpose of this anti-flicker blade being to even up the periods of time between light and darkness, thereby reducing flicker.

The object of this invention is attained by combining the rotating shutter with the rotating color wheel, in such a way that the rotating color wheel may be readily and easily adjusted into operative position for color projection, or it may readily and easily be adjusted for noncolor, i. e., black and white, projection.

It is well known by those skilled in the art that the standard motion picture projection machines now used for exihibiting black and white pictures, are so constructed that the rotating shutter and shutter shaft make one complete revolution during the period that the intermittent film feed mechanism advances the film the distance of one single picture area and holds said picture area in position for exhibition.

To adapt such machines for exhibiting motion pictures in natural colors by the use of a combination shutter and rotating color screens, it is necessary that the combination shutter and color filter screens make one complete revolution during the period of time that the intermittent film feed mechanism advances the film successively the distance of two picture areas. This phase of "additive" color motion picture projection will be more fully understood by referring to my Patent No. 1,607,593, dated November 16, 1926 and my Patent No. 1,623,435, dated April 5, 1927; also, such reference will greatly aid in a complete understanding of my present invention inasmuch as that my present invention is designed for use in combination with the apparatus shown in said Patent No. 1,623,435.

A rotatable shutter and color filter screen made in accordance with this invention is designed to make one complete revolution during the period of time that the intermittent film feed mechanism advances the film successively the distance of two picture areas. This is conveniently accomplished by using the apparatus disclosed in my Patent No. 1,623,435, whereby the color screen or shutter will be driven at one-half the speed of the shutter shaft of a standard motion picture machine. As disclosed in my Patent No. 1,623,435 the red and green picture areas follow each other in succession on the film. The color filter screen of my present invention is designed to make one complete revolution during the period that the film feed mechanism would feed one red and one green picture area through the projecting apparatus.

In the drawings:

Fig. 1 is a face view of my screen device with the color filter sections adjusted to their operative positions;

Fig. 2 a face view with the color filter sections adjusted to their inoperative positions;

Fig. 3 a side view showing the screen device applied to a motion picture projection machine;

Fig. 4 a detail face view of one of the screen frames and the shutter and anti-flicker sections carried by it;

Fig. 5 a similar view of the companion frame and the color filter sections carried thereby;

Fig. 6 a section taken on the line 6—6 of Fig. 1;

Fig. 7 a detail section taken on the line 7—7 of Fig. 1;

Fig. 8 a section taken on the line 8—8 of Fig. 4;

Figs. 9 and 10 sections taken on the lines 9—9 and 10—10 respectively of Fig. 5; and Fig. 11 a detail end view of the hub member of the screen device.

Referring by numerals to the various parts of the screen device, 1 and 2 designate two flat circular frames each preferably formed of a sheet metal stamping. The frame 1 includes a rim $1^a$, a disk-like central portion $1^c$ and radial arms $1^b$ connecting the rim and central portion and spaced apart around the center of the frame. The frame 2 is similarly formed with a rim $2^a$, central portion $2^c$ and radial arms $2^b$. The two frames are of the same diameter and their radial arms are substantially similarly spaced. The frame 1 is formed with a circular central opening $1^d$ and the frame 2 is formed with a materially larger circular central opening $2^d$.

A disk-like hub member 3 is associated with the two frames. This member is formed at one face with a reduced journal portion 4 which fits in the opening $2^d$ of the frame 2 for relative rotation. Outwardly of the journal 4 the hub forms a flange 5 which overlaps the central portion of the frame 2 around the opening $2^d$. The inner end of the journal is flat and has the frame 1 disposed against it with the opening $1^d$ thereof in alinement with a central opening 6 in the hub. The length of the journal is only a trifle greater than the thickness of the frame 2 so that the two frames are disposed face to face and substantially in contact. They are held in this relation by screws 7 which pass inwardly through openings 8 in the hub and are threaded into openings 9 in the frame 1. The hub is thus secured rigidly to the frame 1 while the frame 2 is retained against endwise displacement but is free to rotate upon the journal 4 relatively to the hub and frame 1.

The radial arms $1^b$ of the frame 1 are arranged in four equally spaced pairs which carry the screen sections 10 and $10^a$ and the screen sections 11 and $11^a$ and leave four open, unobstructed exposure spaces E between said four sections. These sections are panels of transparent or translucent material such as gelatin in sheet form. Each panel sheet extends over the arms $1^b$ at the sides and at its inner and outer ends overlaps the rim $1^a$ and the central portion $1^c$ of frame 1. The sheets are held in place by open frames 12 which are segmental in shape and register with the arms $1^b$, the adjacent portions of the rim $1^a$ and the central portion $1^c$ of the frame so that they bear against the marginal edges of the sheets. The frames 12 are held in firm contact with the sheets by screws 13 which are threaded into openings in the frame 1. The frames and the panel sheets are mounted upon the face of frame 1 which is directed outwardly away from the companion frame 2. The sections 10 and $10^a$ form shutter blades and the sections 11 and $11^a$ form anti-flicker blades.

The transparency of the gelatin sheets forming the shutter and anti-flicker sections or blades is greatly reduced by coloring matter. The shutter sections 10 and $10^a$ are colored respectively, dark-blue-violet and dark red. Similarly the anti-flicker section 11 is colored dark-blue-violet and the anti-flicker section $11^a$ dark red. In the drawings these colors are designated D—B—V and D—R. The shutter sections 10 and $10^a$ are disposed at diametrically opposite sides of the screen axis as are also the anti-flicker sections 11 and $11^a$. The latter sections are arranged at right angles to the shutter sections.

The arms $2^b$ of the frame 2 are arranged in four pairs similarly to the arms $1^b$ and in a similar manner they carry screen sections 14, 15, 16 and 17 and leave four open, unobstructed exposure spaces E' between said sections. These sections are formed of transparent or translucent gelatin sheets secured in place upon frame 2 by open segmental frames 18 similar to the frames 12, and the areas of the sections are sufficient to cover the exposure spaces E in the frame 1. The frames 18 are secured to the outer face of the frame 2 by screws 19. The sections 14, 15, 16 and 17 are color filter exposure sections and are colored respectively red, orange, blue and green designated R, O, B and G in the drawings. These sections possess much greater transparency than the shutter and anti-flicker sections and the pictures are projected through them to the viewing screen when the device is used with a projection machine. Red and orange are more conspicuous than blue and green and in order to even the color projection upon the viewing screen the effective areas of the red and orange sections 14 and 15 have been reduced below the areas of the blue and green sections 16 and 17. This reduction is effected by superposing upon the sections 14 and 15 two gelatin strips 20 and 21. These strips are colored dark red and are only very slightly transparent. When the various sections are relatively adjusted as shown in Fig. 1 the strips are disposed adjacent the shutter sections 10 and $10^a$ and in effect form a continuation thereof. They thus serve to both augment the shutter sections and reduce the exposure sections 14 and 15. By reducing the circumferential length of the latter sections the duration of the light projection through them during each rotation of the screen is diminished. The strips 20 and 21 are disposed beneath the frames 18 and are held by the latter flat against the sheets 14 and 15.

The exposure sections are adjustable to positions between the shutter and anti-flicker sections as shown in Fig. 1, or to positions in register or alinement with the latter sections, as shown in Fig. 2. These adjustments are made by rotating the frames 1 and 2 relatively to each other. To limit the extent of this relative rotation a stop pin 22 is provided upon the central portion of the frame 2 and projects out into a peripheral notch 23 formed in the flange 5 of the hub 3. The length of the slot is such that the respective ends thereof engage the stop pin to limit the relative rotation of the screen frames in either direction and ensure an accurate adjustment of the screen sections. Locking means are provided to hold the frames 1 and 2 in either of their adjusted positions. Upon the outer face of the rim 2ª of the frame 2 a leaf spring 24 is secured at one of its ends. The other end of said spring is free and carries an inwardly projecting locking pin 25 and an outwardly extending operating knob 26. The rim 1ª of the frame 1 is formed with two apertures 27 and 28 in the path of the locking pin 25 and spaced apart according to the relative movement of the frames 1 and 2 from one adjustment to the other. In the adjustment shown in Fig. 1 the pin 25 is snapped into the aperture 27. In the adjustment shown in Fig. 2 the pin engages the aperture 28. Release is effected for changing either adjustment by lifting the operating knob to free the pin.

The screen device may be mounted upon the shutter shaft of a projection machine in any suitable manner. Certain methods of color motion picture projection now in use require a change in the rate of shutter rotation with relation to the film feed when a shift is made from black and white projection to color projection. In the former the shutter disk or screen must rotate once during the period of projection and change of each picture while in color projection it is required to rotate only once during two of said periods of projection and change. In Fig. 3 I have indicated my improved screen device as mounted upon the shutter shaft S of a projector. Connected to this shaft is a speed-reducing mechanism M which is fully shown and described in my Patent No. 1,623,435. It will be understood, however, that my screen device is susceptible of use in other connections.

By changing the ratio between the rotating screen or shutter disk and the film-advancing mechanism, so that the shutter disk makes one complete rotation during the advancing and exhibiting of two film images or pictures it is obvious that only one half of the entire circumferential length of the shutter disk will pass before the projection light flux during the advancing and exhibiting of one film image. This necessitates the employment of two shutter sections and two anti-flicker sections with openings between the sections through which the projection light flux passes. This necessity is taken care of in the present device by the provision of the two shutter sections 10 and 10ª and the two anti-flicker sections 11 and 11ª.

The shutter sections are made slightly transparent and are colored in order to maintain a reduced illumination of the projection viewing screen during the period of picture change and to maintain the color effect during that part of reduced illumination.

When the screen device is mounted upon the shutter shaft of a projection machine and it is desired to project colored pictures, the frames 1 and 2 are relatively adjusted to dispose the color filter exposure sections in their operative positions between the shutter sections and anti-flicker sections. The color filter sections then cover the exposure spaces E and the entire area of the screen disk is closed as shown in Fig. 1 to receive the projected light. When it is desired to change to black and white projection the frames 1 and 2 are adjusted to dispose the exposure sections in their inoperative positions behind the shutter sections and anti-flicker sections and in accurate register or alinement with them as shown in Fig. 2. The exposure spaces E and E' are then also in register and clear open exposure spaces are left between the shutter sections and anti-flicker sections. This simple unitary screen device thus enables the shift from color to black-and-white projection or vice versa to be made easily and quickly by a simple manipulation. It may be readily applied to projectors of standard form and it avoids the necessity of removing one screen and substituting another when a color shift is made.

While I have disclosed what I now consider the preferred embodiment of my invention I do not wish to be limited to the precise structure, color arrangement and adaptation of the device described and shown but reserve the right to make such changes as will lie within the scope of the claims.

What I claim is:

1. A rotatable screen device for motion picture machines comprising a pair of shutter sections and a pair of anti-flicker sections all supported spaced apart around the axis of rotation; two pairs of color filter exposure sections supported spaced apart around said axis; and means rendering said exposure sections adjustable about the axis relatively to the shutter and anti-flicker sections, whereby the exposure sections may be disposed in register with the shutter and anti-flicker sections or in register with the spaces between them.

2. A rotatable screen device for motion picture machines comprising a pair of shutter sections and a pair of anti-flicker sections supported spaced apart around the axis of rotation; two pairs of color filter exposure sections supported spaced apart around the axis of rotation and colored respectively red, orange, blue and green; and means rendering said exposure sections adjustable about the axis relatively to the shutter and anti-flicker sections, whereby they may be disposed in register with the shutter and anti-flicker sections or in register with the spaces between them.

3. A rotatable screen device for motion picture machines comprising a pair of shutter sections supported spaced apart around the axis of rotation; a pair of red and green color filter exposure sections supported spaced apart around the axis, the red filter section being circumferentially shorter than the green section; and means rendering said color filter sections adjustable about the axis relatively to the shutter sections, whereby they may be disposed in register with the shutter sections or in register with the spaces therebetween.

4. A rotatable screen device for motion picture machines comprising a pair of shutter sections and a pair of anti-flicker sections all supported spaced apart around the axis of rotation; two pairs of color filter exposure sections colored respectively red, orange, blue and green, supported spaced apart around the axis, the red, and orange sections being circumferentially shorter than the blue and green sections; and means rendering said color filter sections adjustable about the axis relatively to the shutter and anti-flicker sections, whereby they may be disposed in register with the shutter and anti-flicker sections or in register with the spaces between them.

5. A rotatable screen device for motion picture machines comprising a pair of shutter sections and a pair of anti-flicker sections all supported spaced apart around the axis of rotation; and four color filter exposure sections colored respectively red, orange, blue and green supported to occupy the four spaces between the shutter and anti-flicker spaces, the red and orange sections being circumferentially shorter than the blue and the green sections.

6. A rotatable screen device for motion picture machines comprising a pair of shutter sections and a pair of anti-flicker sections all supported, spaced apart around the axis of rotation, one section of each pair being dark red and the other dark-blue-violet and all being slightly transparent; and four color filter exposure sections colored respectively red, orange, blue and green, supported to occupy the spaces between the said shutter and anti-flicker sections.

7. A rotatable screen device for motion picture machines comprising a pair of shutter sections and a pair of anti-flicker sections all supported spaced apart around the axis of rotation, one section of each pair being dark red and the other dark-blue-violet and all being slightly transparent; four color filter exposure sections colored respectively red, orange, blue and green supported spaced apart around the axis of rotation; and means rendering said color filter exposure sections adjustable around the axis relatively to the shutter and anti-flicker sections whereby they may be disposed in operative positions in register with the spaces between the latter sections or in inoperative positions in register with said sections.

8. A rotatable screen device for motion picture machines comprising two flat frames extending around a common axis of rotation, disposed face to face and connected together to form a unit adapted to be mounted upon a shaft; a pair of shutter sections and a pair of anti-flicker sections carried by one of said frames and all spaced apart around the axis; two pairs of color filter exposure sections carried by the other frame and all spaced apart around the axis; means rendering said frames relatively rotatable about their axis to position the exposure sections into or out of register with the shutter and anti-flicker sections; and means to lock said frames together in either of said adjustments of the sections the shutter and anti-flicker sections being of sufficient area to cover the registering exposure sections.

9. A unitary rotatable screen device for motion picture machines comprising a plurality of shutter sections supported spaced apart around the screen axis to leave open areas for the passage of light between the sections; a plurality of color filter exposure sections supported spaced apart around the axis to leave open areas for the passage of light between the sections; means rendering said exposure sections adjustable about the axis relatively to the shutter sections to dispose the exposure sections in operative positions between the shutter sections and close the open areas between the latter in one adjustment and in another adjustment to dispose the exposure sections in inoperative positions in alinement with the shutter sections and leave the areas between the latter open, the shutter sections being of sufficient area to cover the exposure sections; and means to lock the shutter and exposure sections to rotate together in either of said adjustments.

10. A rotatable screen device for motion picture machines comprising a plurality of shutter sections supported spaced apart around the screen axis to leave clear areas for the passage of light between the sections; a plurality of color filter exposure sections supported spaced apart around the axis to leave clear areas for the passage of light between the sections; means rendering said exposure sections adjustable about the axis relatively to the shutter sections to dispose the exposure sections in operative positions between the shutter sections to close the clear areas between the latter in one adjustment and in another adjustment to dispose the exposure sections in inoperative positions in alinement with the shutter sections to leave the areas between the latter clear, the shutter sections being of sufficient area to cover the exposure sections; and means to hold the shutter and exposure sections to rotate together in either of said adjustments.

11. A rotatable screen device for motion picture machines comprising a plurality of anti-flicker sections supported spaced apart around the screen axis to leave clear areas for the passage of light between the sections; a plurality of color filter exposure sections supported spaced apart around the axis to leave clear areas for the passage of light between the sections; means rendering said exposure sections adjustable about the axis relatively to the anti-flicker sections to dispose the exposure sections in operative positions between the anti-flicker sections to close the clear areas between the latter in one adjustment and in another adjustment to dispose the exposure sections in inoperative position in alinement with the anti-flicker sections to leave the areas between the latter clear, the anti-flicker sections being of sufficient area to cover the exposure sections; and means to hold the anti-flicker and exposure sections to rotate together in either of said adjustments.

12. A unitary rotatable screen device for motion picture projection machines comprising a plurality of shutter sections supported spaced apart around the screen axis to leave clear uncolored areas for the passage of light between the sections; a plurality of color filter exposure sections; means rendering said exposure sections adjustable about the axis relatively to the shutter sections to dispose the exposure sections in operative positions between the shutter sections to close the clear areas between the latter in one adjustment and in another adjustment to dispose the exposure sections in inoperative positions in alinement with the shutter sections to leave the areas between the latter clear, the shutter sections being of sufficient area to cover the exposure sections; and means to hold the shutter and exposure sections to rotate together in either of said adjustments, the screen being adapted to be mounted upon a shaft.

13. A unitary convertible rotatable screen device for motion picture projection machines comprising a shutter section and an anti-flicker section supported spaced apart around the screen axis to leave clear, uncolored areas for the passage of light between the sections; a plurality of color filter exposure sections; means rendering said exposure sections adjustable about the axis relatively to the shutter and anti-flicker sections in operative positions between the shutter and anti-flicker sections and at the sides thereof to close the clear areas in one adjustment, and in another adjustment to dispose the exposure sections in inoperative position in alinement with the shutter and anti-flicker sections to leave the areas between the latter and at the sides thereof clear, the shutter and anti-flicker sections being of sufficient area to cover the exposure section, whereby the screen is convertible for either black and white or color projection; and means to hold the shutter and anti-flicker sections and the exposure sections to rotate together in either of said adjustments and to adapt the screen to be mounted upon a shaft.

14. A unitary rotatable screen device for a motion picture projection machine adapted to be mounted upon a shaft and comprising shutter means; color filter exposure means mounted for adjustment to operative position out of register with said shutter means to adapt the screen for color projection, and for adjustment to inoperative position in register with the shutter means to adapt the screen for pure black and white projection, the shutter means being designed to entirely cover the color filter exposure means in the inoperative adjustment of the latter; and means carried by the device to maintain either of said adjustments and hold the shutter and exposure means to rotate together.

15. A unitary rotatable screen device for motion picture machines adapted to be mounted upon a shaft and comprising a shutter segment designed to leave a clear space at one side thereof for the passage of light; a color filter exposure segment; means carried entirely by the screen device rendering said exposure section adjustable about the screen axis relatively to said shutter segment to bring it into an operative position out of register with the shutter segment and in register with said clear space, or into an inoperative position in register with the shutter segment, the latter being of sufficient area to cover the exposure segment; and means carried by the device to maintain either of said adjustments and hold the shutter and exposure sections to rotate together.

In testimony whereof I hereunto affix my signature.

FREDERICK T. O'GRADY.